United States Patent
Pan et al.

(10) Patent No.: US 11,189,047 B2
(45) Date of Patent: Nov. 30, 2021

(54) GAZE BASED RENDERING FOR AUDIENCE ENGAGEMENT

(71) Applicant: Disney Enterprises, Inc., Burbank, CA (US)

(72) Inventors: Ye Pan, Glendale, CA (US); Kenny Mitchell, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 236 days.

(21) Appl. No.: 16/298,848

(22) Filed: Mar. 11, 2019

(65) Prior Publication Data
US 2020/0294264 A1 Sep. 17, 2020

(51) Int. Cl.
| | |
|---|---|
| *G06F 3/01* | (2006.01) |
| *G06T 7/70* | (2017.01) |
| *G06T 7/246* | (2017.01) |
| *G06T 7/00* | (2017.01) |

(52) U.S. Cl.
CPC ............... *G06T 7/70* (2017.01); *G06F 3/013* (2013.01); *G06T 7/248* (2017.01); *G06T 7/97* (2017.01); *G06T 2207/20212* (2013.01)

(58) Field of Classification Search
CPC ........... G06F 3/013; G06T 2207/20212; G06T 7/248; G06T 7/70; G06T 7/97; G06T 15/20; G06K 9/0061
See application file for complete search history.

(56) References Cited

U.S. PATENT DOCUMENTS

| | | | |
|---|---|---|---|
| 5,714,997 A * | 2/1998 | Anderson | G02B 27/017 348/39 |
| 9,424,467 B2 | 8/2016 | Lawler | |
| 10,319,149 B1 * | 6/2019 | Cowburn | G06T 13/20 |
| 10,353,535 B2 * | 7/2019 | Ng | H04N 13/117 |
| 10,362,301 B2 * | 7/2019 | Ng | H04N 13/351 |
| 10,404,974 B2 * | 9/2019 | Dietz | H04N 13/324 |
| 2005/0168402 A1 * | 8/2005 | Culbertson | G06T 19/20 345/8 |
| 2013/0050448 A1 * | 2/2013 | Swan | H04N 13/341 348/54 |
| 2013/0195322 A1 * | 8/2013 | Santhiveeran | G06Q 30/0269 382/118 |
| 2013/0234934 A1 * | 9/2013 | Champion | G06F 3/0304 345/156 |
| 2014/0129966 A1 * | 5/2014 | Kolesnikov | G06F 3/0482 715/765 |

(Continued)

OTHER PUBLICATIONS

Gotsch et al., "TeleHuman2: A Cylindrical Light Field Teleconferencing System for Life-Size 3D Human Telepresence", CHI 2018, Montreal, QC, Canada, Apr. 21-26, 2018, 11 pages.

(Continued)

*Primary Examiner* — Siamak Harandi
(74) *Attorney, Agent, or Firm* — Dorsey & Whitney LLP (57) ABSTRACT

The present disclosure is related to an audience engagement system and method to display images on a display. The method includes detecting a gaze direction of a designated viewer, rendering a gaze object within an image on a gaze axis corresponding to the gaze direction, rendering an audience object within the image on a normal axis corresponding to a display axis, composting the audience object and the gaze object together in a composited image, and displaying the composited image on the display.

20 Claims, 11 Drawing Sheets

(56) References Cited

U.S. PATENT DOCUMENTS

| | | | | |
|---|---|---|---|---|
| 2014/0267771 | A1* | 9/2014 | Lawler | G06K 9/00597 |
| | | | | 348/169 |
| 2015/0279321 | A1* | 10/2015 | Falconer | G09G 5/10 |
| | | | | 345/589 |
| 2015/0365647 | A1* | 12/2015 | Coming | H04N 13/351 |
| | | | | 345/422 |
| 2017/0153926 | A1* | 6/2017 | Callegari | G06F 9/5044 |
| 2018/0113593 | A1* | 4/2018 | Ng | H04N 13/257 |
| 2019/0042834 | A1* | 2/2019 | Gavino | G06T 5/002 |
| 2019/0091565 | A1* | 3/2019 | Nelson | G07F 17/32 |
| 2019/0206118 | A1* | 7/2019 | Radel | G06T 19/20 |
| 2019/0253724 | A1* | 8/2019 | Nelson | G06K 9/00664 |
| 2019/0333265 | A1* | 10/2019 | Kim | H04L 29/06 |
| 2020/0082629 | A1* | 3/2020 | Jones | G06T 7/70 |
| 2020/0090367 | A1* | 3/2020 | Nishiyama | G06T 7/73 |
| 2020/0104522 | A1* | 4/2020 | Collart | G06F 21/6218 |
| 2020/0128232 | A1* | 4/2020 | Hwang | A61B 5/163 |

OTHER PUBLICATIONS

Nguyen et al., "Multiview: Spatially Faithful Group Video Conferencing", Department of Electrical Engineering and Computer Science, University of California, Berkeley, CHI 2005, Portland, Oregon, Apr. 2-7, 2005, 10 pages.

Pan et al., "A Gaze-Preserving Situated Multiview Telepresence System", Session: Telepresence and Connecting Over Video, CHI 2014, One of a CHInd, Toronto, ON, Canada, Apr. 26- May 1, 2014, 4 pages.

Pan et al., "Comparing Flat and Spherical Displays in a Trust Scenario in Avatar-Mediated Interaction", Session: On and Above the Surface, CHI 2014, One of a CHInd, Toronto, ON, Canada, Apr. 26-May 1, 2014, 10 pages.

Ravnik et al., "Dynamic Anamorphosis as a Special, Computer-Generated User Interface", The British Computer Society, Apr. 19, 2013, 18 pages.

* cited by examiner

GAZE BASED RENDERING FOR AUDIENCE ENGAGEMENT

FIELD

The present disclosure relates generally to gaze based rendering of images.

BACKGROUND

Dynamic displays that display images or videos that interact with viewers are used in many environments, including amusement parks, advertisement displays, and entertainment venues. With two-dimensional displays, it is possible to include a character that appears to interact with the viewers, such as having eyes or other features that move to follow an animation. However, with current displays, the viewers of the display have the same view, so although there may be some viewer engagement, the engagement is shared by all viewers and not tailored to specific viewers. Additionally, flat monitors typically used with two dimensional displays can limit preservation of gaze direction due to the "Mona Lisa" effect, where the gaze of the character appears to follow a viewer regardless of viewpoint.

SUMMARY

According to one embodiment, an audience engagement system and method to display images on a display is disclosed. The method includes determining a gaze direction of a designated viewer, rendering a gaze object within an image on a gaze axis corresponding to the gaze direction, rendering an audience object within the image on a normal axis corresponding to a display axis, compositing the audience object and the gaze object together in a composited image, and displaying the composited image on the display.

According to another embodiment, an interactive display method to display images to a plurality of viewers is disclosed. The method includes determining a first gaze image of a gaze viewer of the plurality of viewers, utilizing the first gaze image to detect a gaze direction of the gaze viewer, rendering a first image object based on the gaze direction of the gaze viewer, wherein the first image object is rendered relative to a first axis, rendering a second image object relative to a second axis, combining the first image object and the second image object into an image frame, displaying the image frame on a display.

According to yet another embodiment, an image display system for audience engagement is disclosed. The system includes a display that generates visual images, a camera that captures images of audience members, and a computer in electronic communication with the display and the camera. The computer is configured to receive a designated member image, analyze the designated member image to determine a view direction of the designated member, receive a first image frame comprising a first group of objects corresponding to an audience view and a second group of objects corresponding to a designated view, render the first group of objects on a first axis, render the second group of objects based on a second axis corresponding to the view direction of the designated member, composite the first group of objects and the second group of objects into a composite image, transmit the composite image to the display.

In yet another embodiment, an image display method is disclosed. The method includes rendering by a processing element a first group of objects with a normal perspective, rendering a second group of objects with an anamorphic perspective, compositing by the processing element the first group of objects and the second group of objects into a composite image, and transmitting by the processing element the composite image to a display.

SPECIFICATION

The present disclosure is related to a system and methods to generate interactive and viewer engaging displays. In one example, an image including two or more characters or objects is rendered from two different perspectives, such as from a normal perspective and an off-axis perspective, where the off-axis perspective is based on a gaze direction of a designated viewer. To select the off-axis perspective, the gaze direction of the designated viewer is detected or otherwise determined and used to update the rendering axis. After the off-axis character or object has been rendered, a composite image is generated, overlaying the normal axis characters or objects together with the off-axis character or object. This composited image provides a more complete viewer engagement experience than conventional displays, since the normal axis characters may be rendered to include features, such as tracking eyes, turning heads, or the like, that engage a group of viewers, while the off-axis character gaze character is rendered to more fully engage with a selected viewer. In this manner, multiple viewers can engage with different objects or characters in a scene.

Figure 1A:
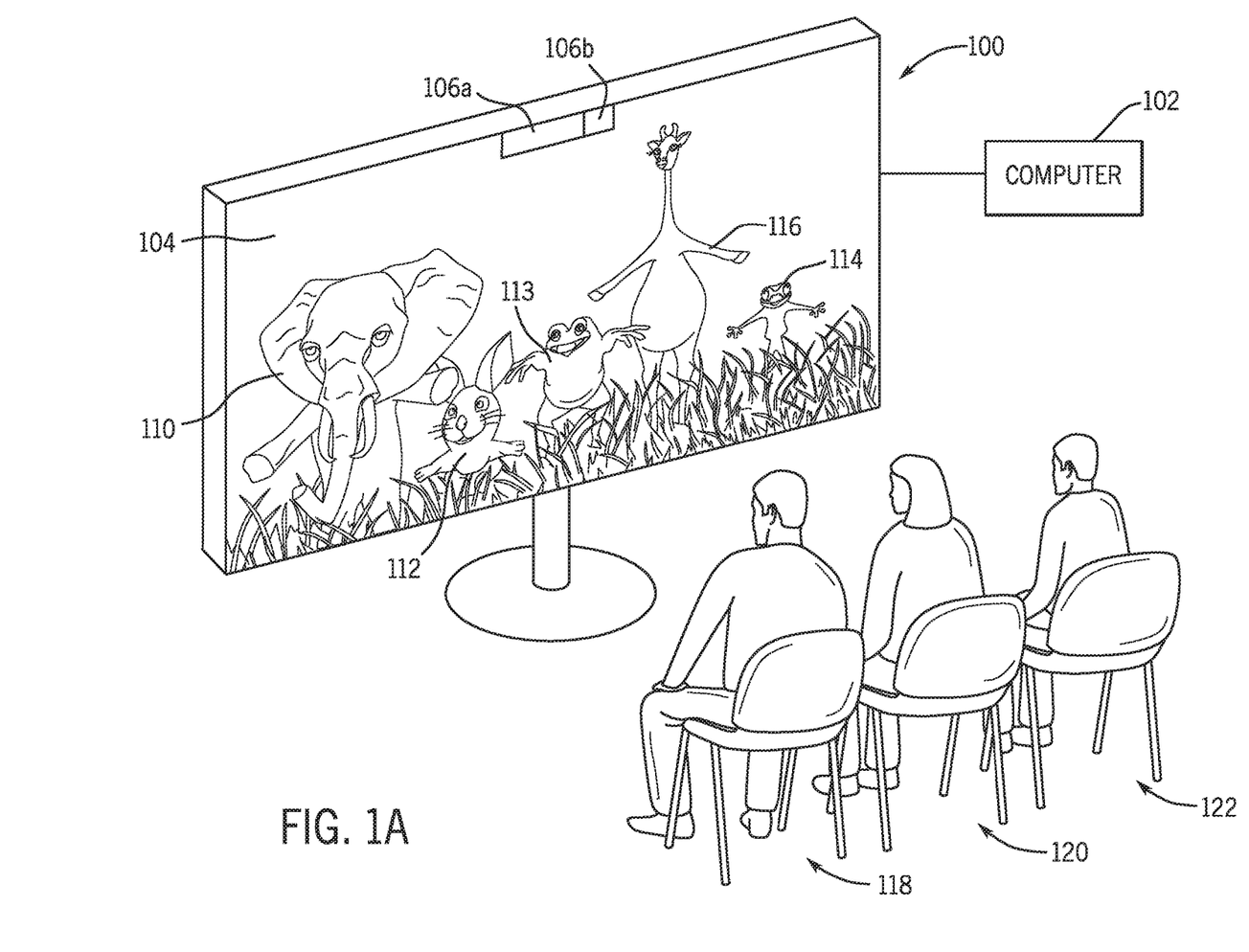
FIG. 1A is a perspective view of a system for generating interactive images rendered from two perspectives.
Figure 1B:
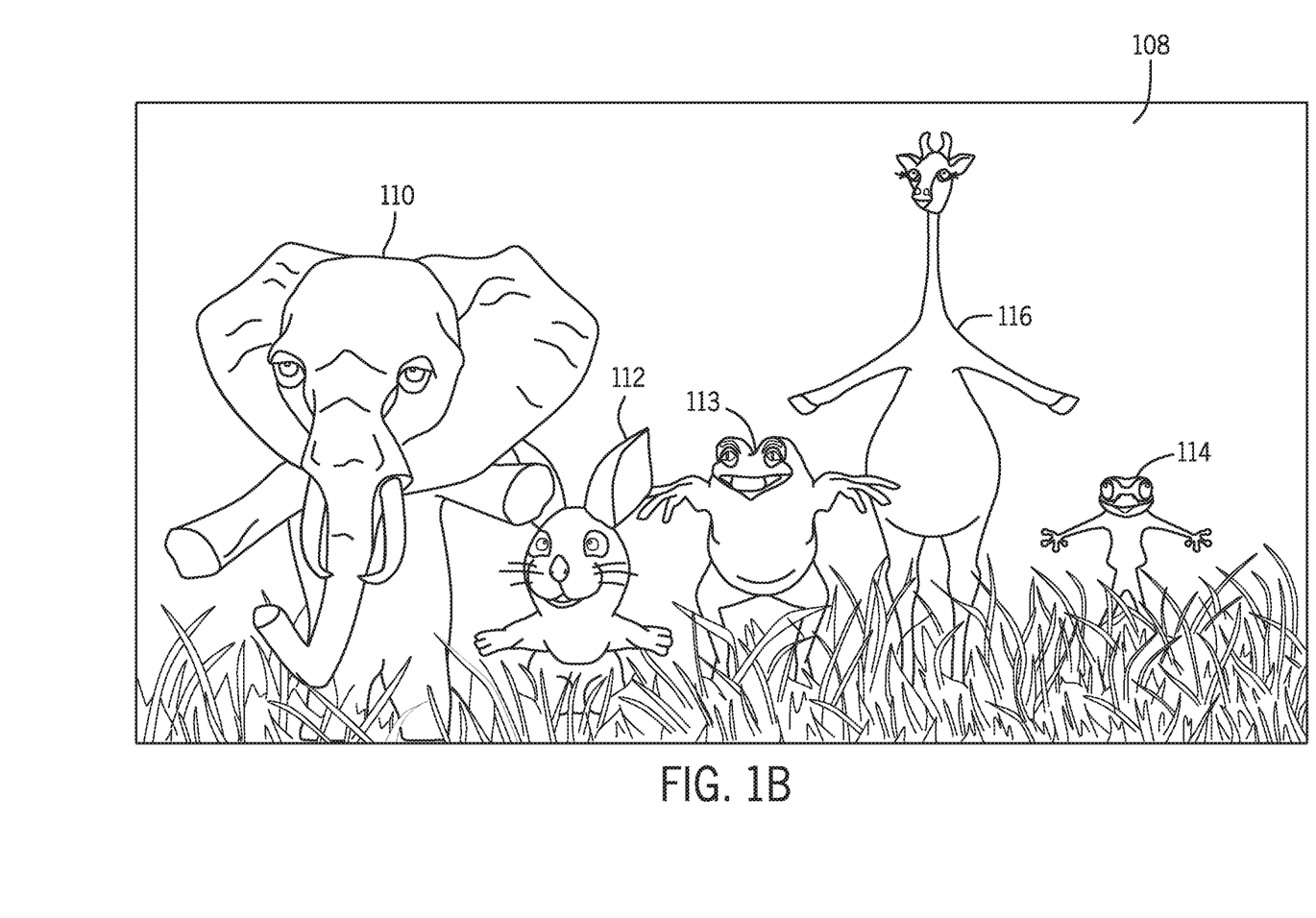
FIG. 1B is an elevation view of an interactive image used in the system of FIG. 1A.

FIG. 1A illustrates an example of a system 100 for displaying individualized gaze engagement images to two or more viewers 116, 118, 122. FIG. 1B illustrates an example of an composite image 108 generated by the display. The system 100 includes a computer 102, a display 104, and one or more gaze detectors 106. The display 104 generates images 108 that may include two or more objects 110, 112, 113, 114, 116 defining subjects or characters within the scene of the image, the scene may include background or other scenic elements, such as the grass shown in FIG. 1A. In this example, at least one object, such as object 114, is selected to vary its rendering axis or perspective based on the gaze direction of at least one viewer 118, 120, 122, such as a designated viewer 118. The remaining subjects 110, 112, 113, 116 may be rendered on a normal axis, regardless of the gaze of the designated viewer 118, but may engage and follow the gaze of the other viewers 120, 122, but without changing the rendering axis. In this manner, the designated or gaze character 114 may be generated with a dynamic anamorphosis that adapts to the changing position of the viewer 118, such that as the designated viewer 118 changes gaze direction or moves relative to the display 104, the gaze subject 114 may remain undeformed. In this example, the designated viewer 118 will continue to see the same image, regardless of the user's viewpoint of the image 108, whereas the remaining viewers 120, 122 will see deformed images of the subjects 110, 112, 113, 114, 116. In this manner, the gaze subject 114 may be anamorphic where the character's distortion depends on the viewpoint and the gaze subject 114 dynamically adapts to the changing position of the designated viewer 118.

Figure 2:
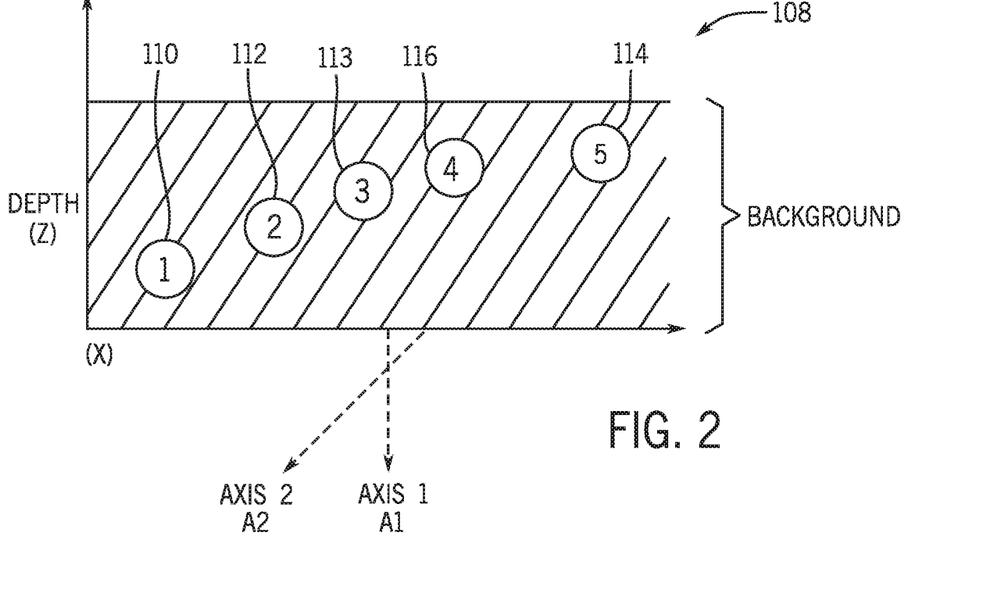
FIG. 2 is a schematic diagram of a depth and axis orientation for objects within the interactive image of FIG. 1B.

FIG. 2 illustrates a schematic view of the composited image 108. As shown in FIG. 2, the image 108 includes the subjects or objects 110, 112, 113, 114, 116 optionally positioned at different z or depth locations within the image 108 with optionally a background or other scene aspects extending around, ahead of, and behind the subjects 110, 112, 113, 114, 116. In this example, a first group of subjects 110, 112, 113, 116 is rendered relative to a first axis A1 perspective, which in one example is normal or perpendicular relative to a front face of the display 104 or an x axis for the image. The second group of subjects, gaze subject 114, is rendered relative to a second axis A2 perspective. The second axis A2 may at times be normal to the display and parallel to the first axis A1, but is variable based on a viewer gaze, and changes to be off-axis or otherwise non-normal and not parallel to the first axis A1, e.g., at an angle relative to the first axis.

Figure 3:
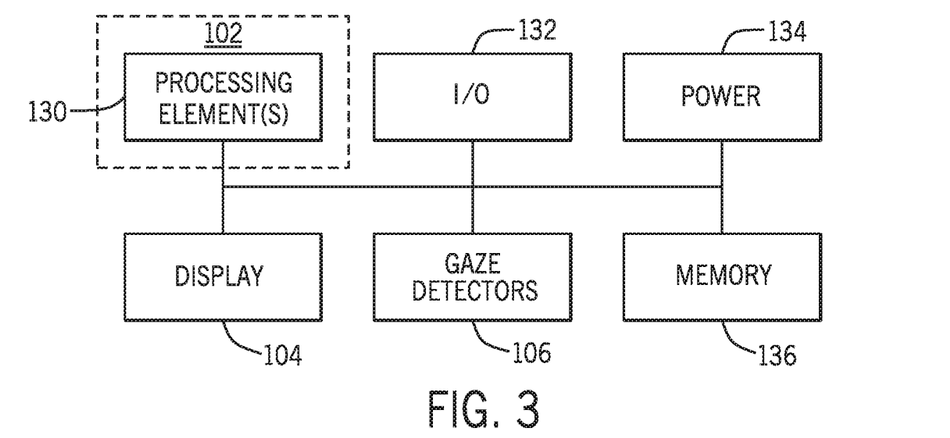
FIG. 3 is a block diagram of the system of FIG. 1A.

FIG. 3 illustrates a block diagram of the system 100, including the computer 102, the display 104, and the gaze detector 106. Additionally, the system 100 may include one or more processing elements 130 that may be incorporated into the computer 102, display 104, or other elements, memory components 136, an input/output interface 132, and a power source 134.

The processing element 130 is substantially any electronic device capable of processing, receiving, and/or transmitting instructions, including one or more graphics processing units, servers, processors, or the like. The memory 136 stores electronic data used by the computer 102, processing element 130, and display 104. The input/output interface 132 provides communication to and from the display 104, the gaze detector 106, and/or computer 102, as well as other devices. The input/output interface 132 can include one or more input buttons, a communication interface, such as WiFi, Ethernet, or the like, as well as other communication components such as universal serial bus (USB) cables, or the like. The power source 134 may be a battery, power cord, or other element configured to transmit power to the components of the projectors.

The display 104 is substantially any type of device that can generate visual outputs, such as a liquid crystal display, organize light emitting diode display, and the like. In many embodiments, the display 104 may be a two-dimensional display with a flat projection surface, but in other examples, the display 104 may be curved, non-planar, or the like. Additionally, the display 104 could be a projected image display on a projection surface, where the projection surface may be a solid surface (e.g., wall), flexible, deforming, movable, or otherwise non-solid surface, e.g., water, rubber, or the like.

The gaze detector 106 may include one more devices capable of detecting viewer characteristics that correspond to a gaze direction, e.g., head position, eye direction, head movement, eye movement, viewer accessories (e.g., hats, glasses, hair), and the like. One example of gaze detection that can be used is found in U.S. Pat. No. 9,424,467 entitled "Gaze Tracking and Recognition with Image Location," which is incorporated by reference for all purposes herein. In some instances the gaze detector 106 may determine a position of a viewer's face and use the face orientation and eye level to estimate a gaze direction. In some embodiments, the gaze detector 106 may include one or more cameras that capture images of the viewer 118, which may then be analyzed by the processing element 130 to determine a gaze direction of the designated viewer 118. In some embodiments, the gaze detector may detect features or aspects that can be correlated or otherwise used to estimate a viewer's gaze. For example, if the system 100 is used in an amusement park, the display or the viewer's seat may be movable. In this example, the position of the viewer's seat or the display, which may be determined by a position detector or via known chorography, can be used to approximate the viewer's gaze. In other words, since the position of the seat is known and changes relative to the display, it can be assumed that the viewer's gaze will change as the seat changes. In this example, the gaze detector will determine the position of the seat or other movable element and translate that into a gaze direction.

Additionally, the gaze detector 106 may include a separate camera or other sensor that detects gaze features of the remaining viewers 120, 122. For example, images of the remaining non-designated viewers 120, 122 may by captured and used to determine gestures, gaze, and the like that determine a gaze direction or perspective. In one embodiment, the gaze detector 106 is used to determine a designated gaze perspective (e.g., the gaze direction of the designated viewer 118) and a normal gaze perspective (e.g., the gaze direction of the remaining viewers 120, 122). In another example, the system may not track the gaze of the non-designated viewers, but rather rely on an animation to change the content or determine a position based on movement within a venue (e.g., ride or seat movement) to determine an audience viewpoint.

Figure 4:
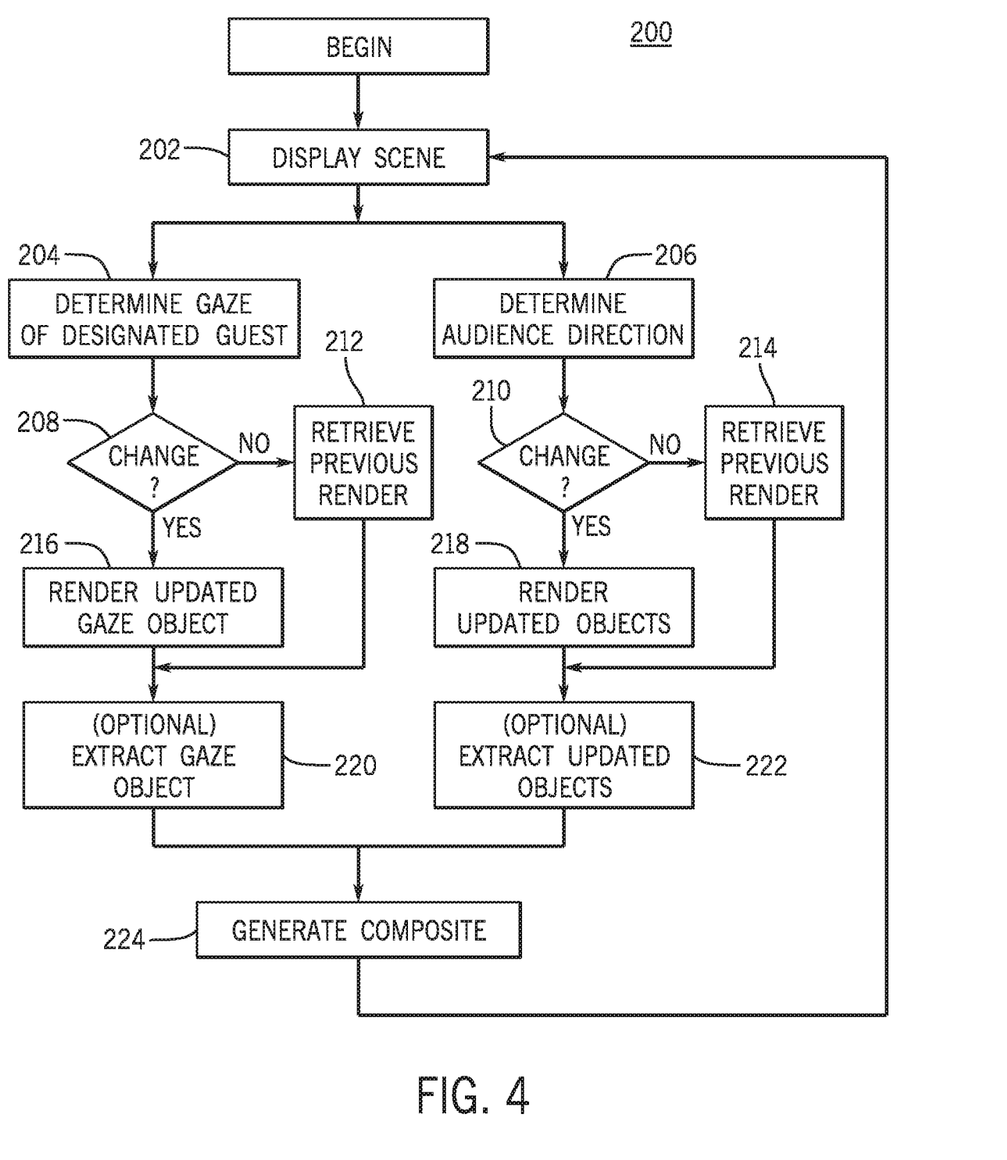
FIG. 4 is a flow chart illustrating a method of to generate composite images for display with the system of FIG. 1A.
Figure 5:
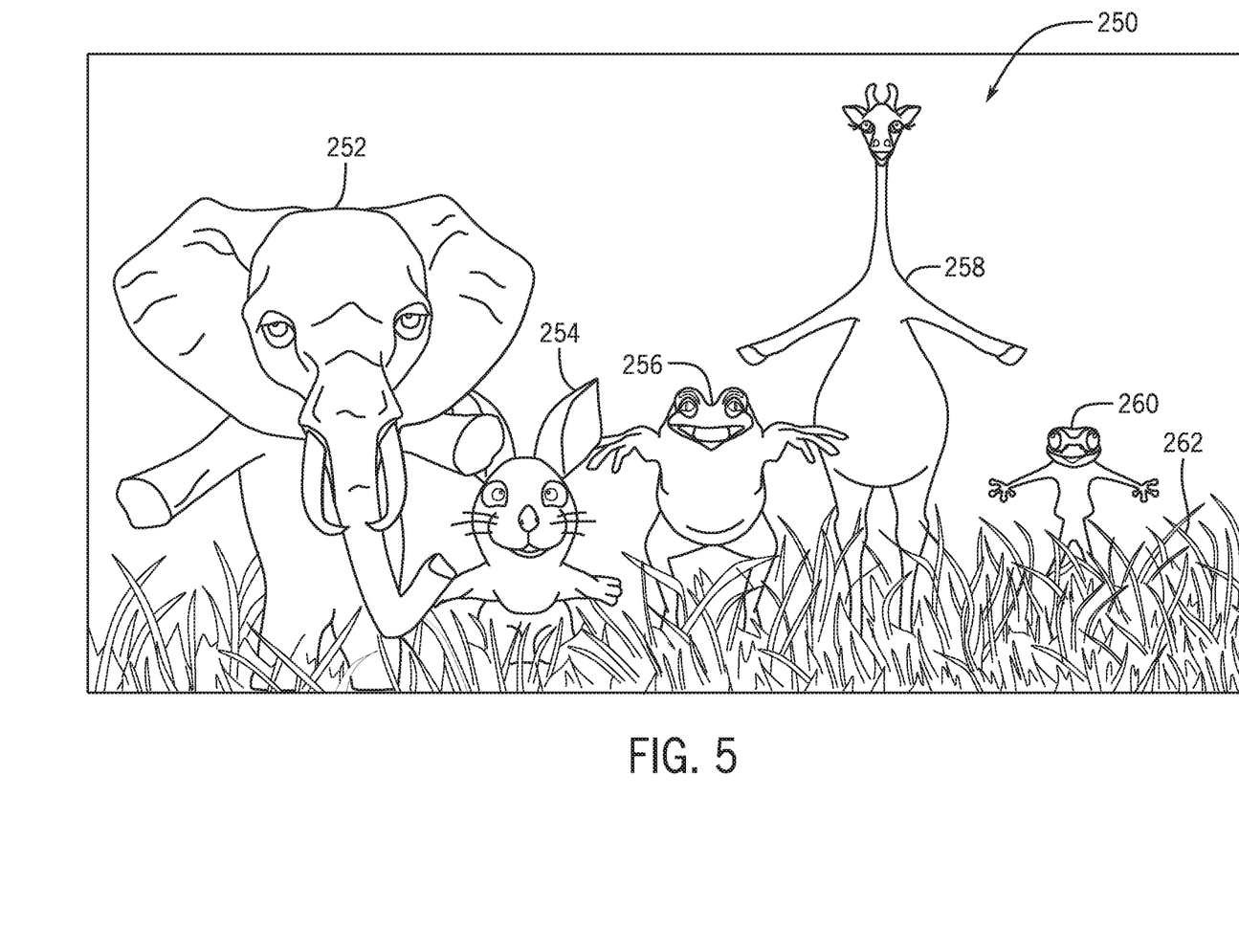
FIG. 5 is a first or initial composite image generated via the method of FIG. 4.

FIG. 4 illustrates a method of using the system 100 of FIG. 1A to display images including a designated viewpoint object or objects and an audience viewpoint object or object. The method 200 may begin with operation 202 and an initial scene image 108 is displayed on the display 104. FIG. 5 illustrates an initial scene image 250 including multiple objects 252, 254, 256, 258, 260 rendered within a background 262 or other scenic elements. Of the objects 252, 254, 258, 260, there may be two groups, a designated or gaze object 260 group and audience object 252, 254, 256, 258 group.

As the initial image 250 is displayed, the method 200 proceeds to operations 204 and 206, which may be executed in parallel or in series to one another. In operation 204, the gaze detector 106a captures images of the designated viewer 118 or group of designated viewers 118, which may then be analyzed by the processing element 130 to determine a gaze direction. For example, the captured images may be analyzed to determine facial features, gestures, or the like, in order to determine a head direction, eye direction, and the like. In some embodiments, there may be two or more designated viewers 118, where the viewers may be arranged sufficiently close together, such as within a threshold viewpoint cone angle, such that the gaze object may engage with two selected viewers simultaneously. It should be noted that operation 204 may not directly detect gaze, but detect or determine positions of other objects or elements that can be used to approximate gaze, e.g., a seat location for the viewer, a ride location, detect viewer accessories or related elements, that may then be used to approximate gaze.

In operation 206, the gaze detector 106b captures images of the audience 120, 122, such as representative audience members or other features, to determine an audience direction, such as a direction a majority of the audience members are facing or looking. It should be noted that operations 204 and 206 may be completed in parallel or in series, depending on the system 100 components. In particular, in some embodiments, the system 100 includes a first gaze detector 106a and a second gaze detector 106b, where the gaze detectors 106a, 106b may simultaneously (or substantially simultaneously) capture images of the designated viewer 118 and the audience viewers 120, 122, respectively. Alternatively, a single gaze detector 106 may be used to serially capture images of the designated viewer 118 and the audience members 120, 122. In other examples, the audience viewpoints may not be captured or detected and rather the audience may engage with a predetermined animation or the like. Alternatively, the audience viewpoint may be determined based on a ride position, e.g., movement of a ride relative to a screen and therefore may not directly detect the audience viewing direction.

With reference again to FIG. 4, after operations 204, 206, the method 200 may proceed to operations 208, 210, respectively. In both operations 208, 210 the processing element 130 analyzes the captured viewer images (e.g., designated viewer image and audience image) to determine if the detected gaze direction or audience direction has changed. In operation 208, the processing element 130 or computer may compare the last determined gaze direction to a new determined gaze direction to determine whether there has been a change over a threshold. In this example, small incremental changes in a gaze direction may be disregarded to expedite processing of the system. For example, the system may compare a current gaze determine to a past gaze detection and determine whether the change in degrees is sufficiently high to render new content. By requiring a higher threshold change, the viewer rendered object and image may appear more stable than with lower thresholds, but the lower the threshold the more engaging and interactive the image may appear. However, in other examples, most changes in gaze direction may be determined as a sufficiently large change, to have a more responsive system 100.

In operation 210, the processing element 130 analyzes images captured of the audience to determine whether there has been any changes in audience direction. This may be a similar process to operation 208, but may be done for a representative audience viewer or multiple audience viewers, with an average direction determined. In other embodiments, the audience direction may be predetermined and/or may not be detected.

Figure 6A:
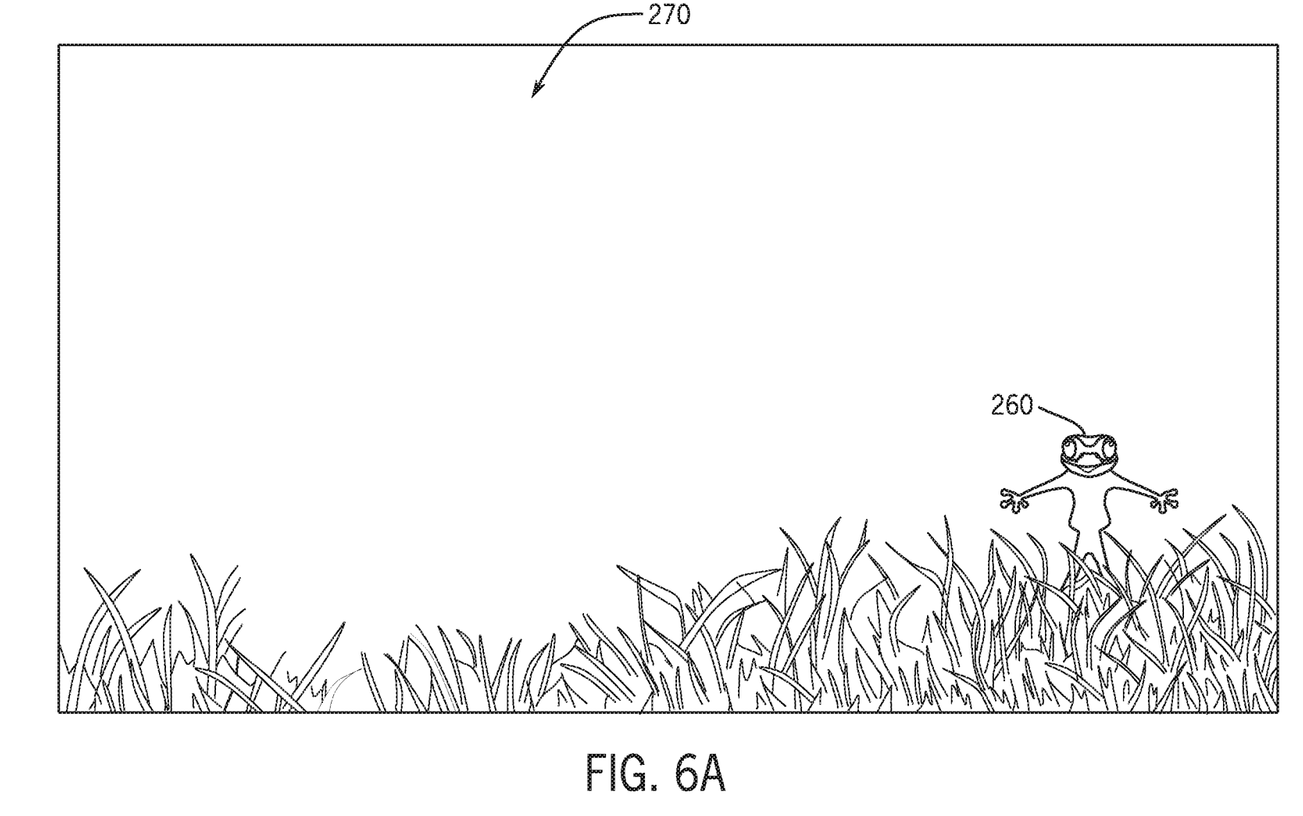
FIG. 6A is a gaze object image with the gaze object rendered on a gaze axis.

If in operation 208, there has been a change in the gaze direction of the designated or gaze viewer 118, the method 200 proceeds to operation 216 and an updated version of the gaze object 260 is rendered. In particular, the processing element 130 uses the designated viewer's 118 gaze direction to select the rendering axis A2 for the gaze character 260. Using the rendering axis A2, which is selected to be normal to the gaze direction of the designated viewer 118, rather than the display 104 plane, the gaze object 260 is deformed. In some embodiments, the gaze object 260 is anamorphically deformed to be adjusted to the gaze direction of the designated user. This may change the orientation of the gaze object 260 within the scene such that the object will be aligned to the gaze direction of the designated viewer 118. FIG. 6A illustrates an example of the gaze rendered image 270 including the gaze object 260 being rendered to be aligned with the gaze directional axis A2, such that from the perspective of the designated viewer 118, the gaze object 260 may appear as undeformed.

If in operation 208, there has been no change in the gaze direction, the method 200 may proceed to operation 212 and the processing element 130 may retrieve the previous version of the rendered gaze object 260, e.g., object from previous image or frame.

After operations 212 or 216, the method 200 may optionally proceed to operation 220 and the gaze object 260 may be extracted or otherwise prepared to be integrated with the audience objects. In some embodiments, operation 220 may be omitted and the scenic elements or background may be in the same frame rendered with the gaze objects 260, such that the audience objects 252, 254, 256, 258 may be added to the rendered image of the gaze object 260 and thus operation 220 may be omitted. However, in other embodiments, the audience objects may be rendered with the scenic or background elements or the background elements may be rendered separately from the objects, and as such, both the audience and gaze objects will be extracted to be overlaid together. In instances where the gaze object 260 is to be imported into another image, the gaze object 260 may be extracted. For example, an extraction mask may be used to define the perimeter of the gaze object 260 and distinguish the gaze object 260 from other elements within the rendered frame. Using the defined perimeter or mask, the gaze object 260 as-rendered will be removed to be inserted into the final image. Conventional extraction or masking techniques, such as chroma key compositing techniques or other masking techniques that can be used to identify selected pixels for masking may be used to identify pixels corresponding to a particular object or character.

Figure 6B:
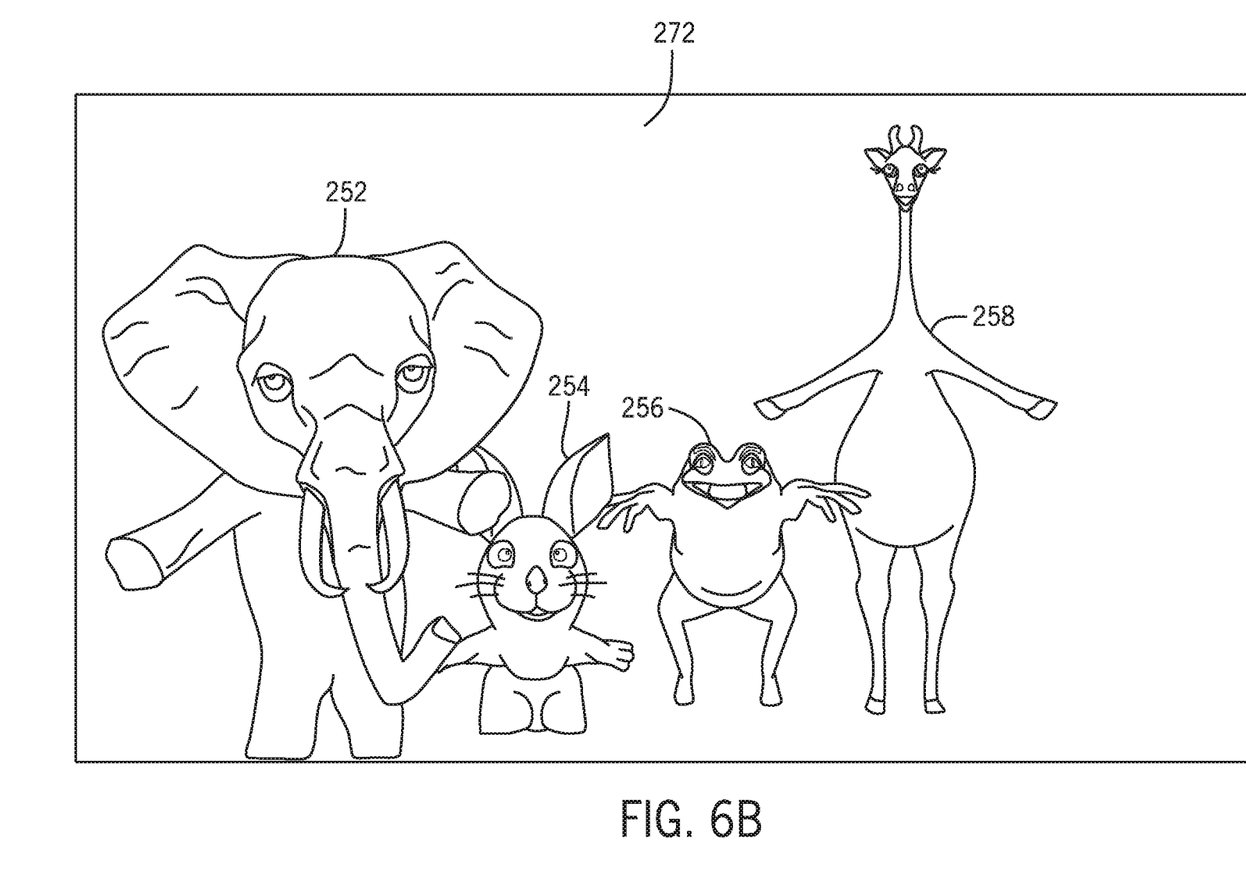
FIG. 6B is an audience object image with the audience objects rendered on a normal or audience axis.

With reference again to FIG. 4, if in operation 210, there has been a change in the audience perspective, the method 200 may proceed to render the audience objects 252, 254, 256, 258. In many embodiments, the audience objects 252, 254, 256, 258 may be rendered from the normal axis A1 regardless of the gaze direction, but may be varied or deform to match the gaze direction. For example, as shown in FIG. 6B, in an example of the audience rendered image 272, the audience characters 252, 254, 256, 258 may be rendered so to as to "follow" the audience direction, which because they are rendered from the normal axis A1, causes the heads and eyes to turn or otherwise deform.

If in operation 210 there has not been a change or the change does not meet a determined threshold, the method 200 may proceed to operation 214 and the processing elements 130 may retrieve a previous rendered version of the audience objects 252, 254, 256, 258, such as from memory 136.

Figure 6C:
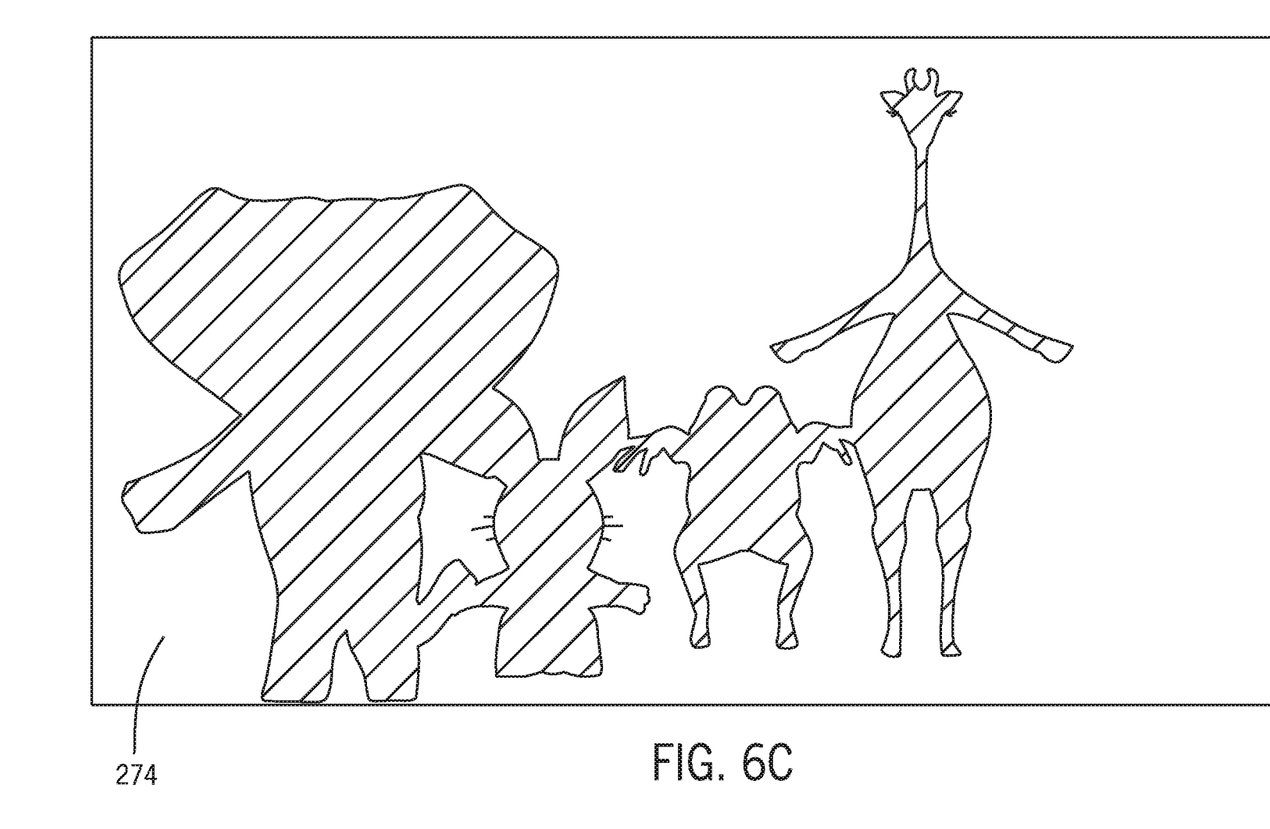
FIG. 6C is a masking image to mask the object images in FIG. 6B.

After operations 214, 218, the method 200 may proceed to operation 222 and the audience objects 252, 254, 256, 258 may be extracted or otherwise prepared to be overlaid with the gaze object 260. FIG. 6C illustrates an example of an extraction mask 274 used to extract the audience objects 252, 254, 256, 258 from the rendered frame. As shown in FIG. 6C, a chroma keying technique having a solid background in the rendered image 272, is used to separate out or define a mask corresponding to the audience objects 252, 254, 256, 258. In this example, the background for the rendered image for the audience objects may be selected to more easily allow the objects to be masked and extracted, e.g., a solid colored background such as blue, green, or black background. Other extraction and image compositing techniques may be used as well.

It should be noted that in embodiments where the audience objects 252, 254, 256, 258 are rendered with the background elements, operation 222 may be omitted, since the gaze object 260 may be overlaid into the audience rendered image. Alternatively, as noted above, in some instances, the audience and gaze objects may be rendered separately from each other and the background elements, and then the background and objects combined together and in these embodiments both operations 220, 222 may be completed to extract the respective objects.

With reference again to FIG. 4, after operations 220, 222, the method 200 proceeds to operation 224 and the final composited image is generated. For example, the processing elements 130 may combine the updated gaze object 260, the updated audience objects 252, 254, 256, 258, and the background elements (which may be rendered with one of the object groups) into a single image frame. In one embodiment, the gaze object 260 is rendered with the background as shown in image 270 and in this embodiment, the audience objects 252, 254, 256, 258 are extracted via the mask shown in mage 274 and layered into the image 270 to generate a final image. In another embodiment, the audience objects 252, 254, 256, 258 are rendered with the background and the updated gaze object 260 is masked via operation 220 and layered into the rendered audience frame. In various embodiments, the objects are combined together to generate the final image. In some instances, the objects may be positioned at different depth locations in the image (see e.g., FIG. 2). In these embodiments, the varying depth locations allow the deformed aspects of the objects to not substantially interfere with one another, especially given the gaze object is rendered relative to a different axis from the other objects in the scene. In some instances, a master virtual camera may be used to determine the ordering and layering of objects within the image frame.

In some instances, especially where the gaze object is a scenic element, rather than a character, the compositing may include a transition section or transition object that transitions between the gaze axis and the normal axis for the scenic and/or objects, i.e., is rendered from a transition perspective that falls between the gaze and audience perspectives. In these instances, the content falling between the gaze axis rendering and the normal axis rendering will be incremented or smoothed to be rendered along one or more scenic axes falling between the gaze axis and the normal axis. In other words, the final image may include multiple rendering axes, with the first object rendered from a gaze axis, the second object rendered from a normal axis, and objects, background, or other elements, rendered from one or more axis directions falling between the gaze axis and the normal axis, where the variable axis directions approach the gaze direction on one end and the normal axis on another end.

After the image has been rendered, the method 200 may return to operation 202 and the new rendered image or scene may be displayed by the display 104.

Figure 7A:
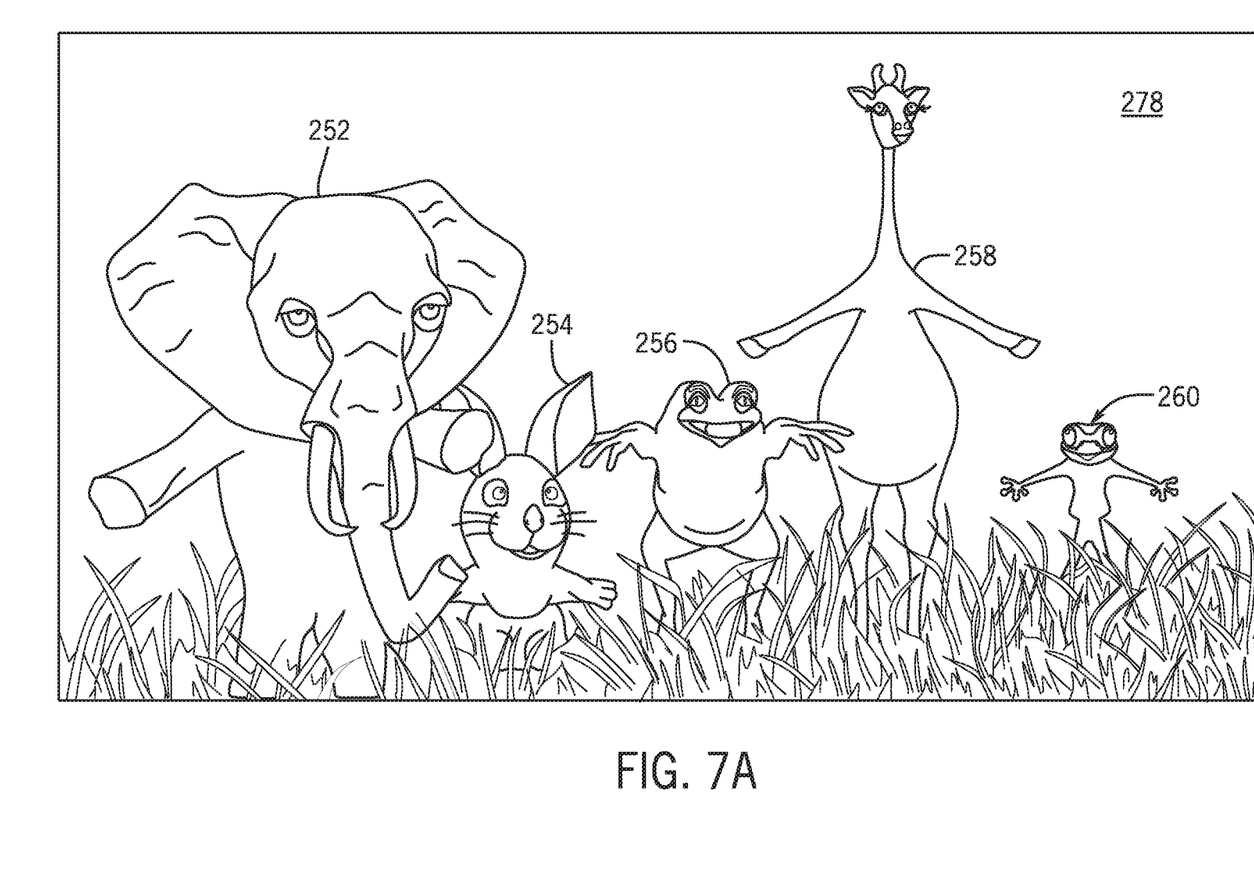
FIG. 7A is a first example of a composite image including gaze objects and audience objects with a first gaze viewpoint.
Figure 7B:
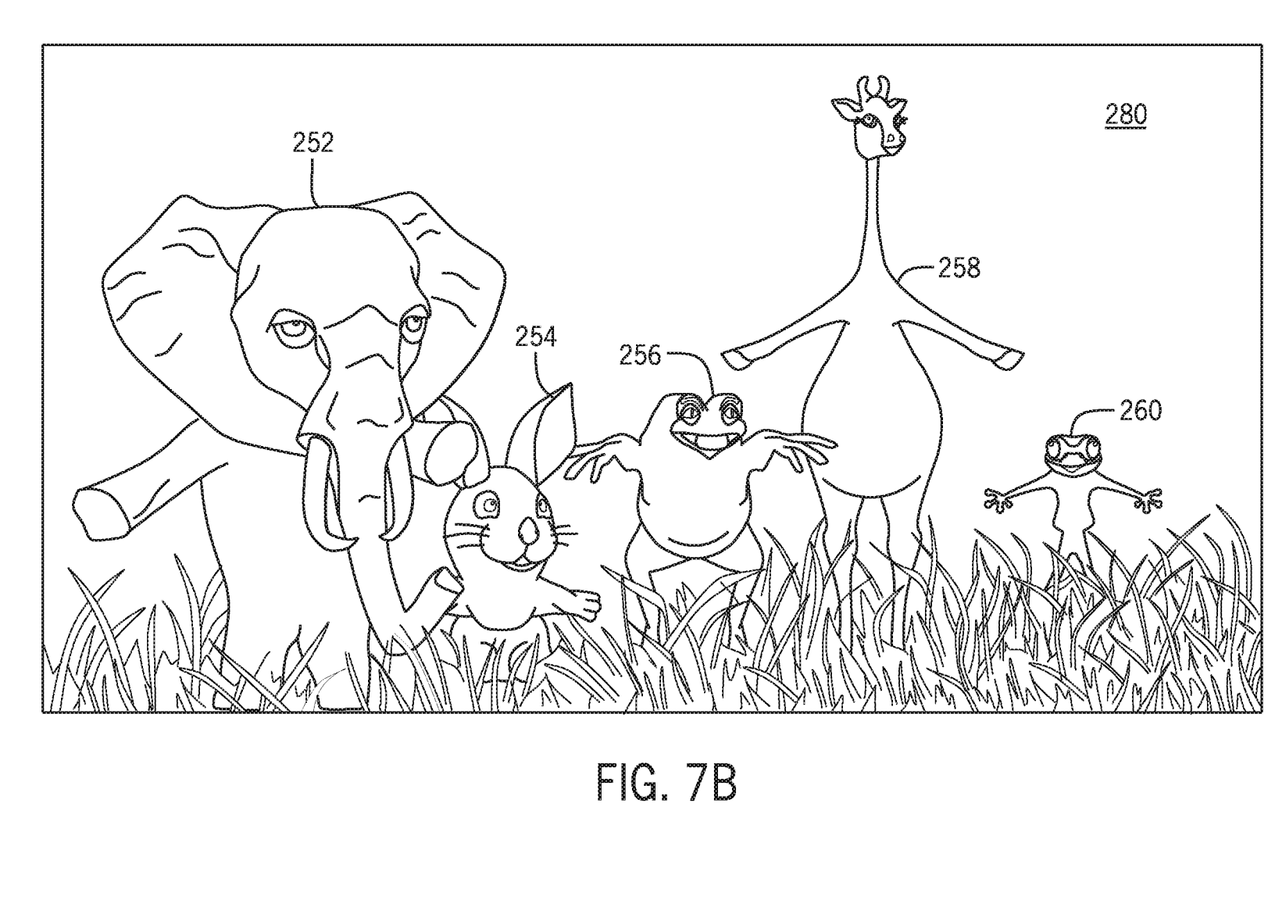
FIG. 7B is a second example of the composite image including gaze objects and audience objects with a second gaze viewpoint.
Figure 7C:
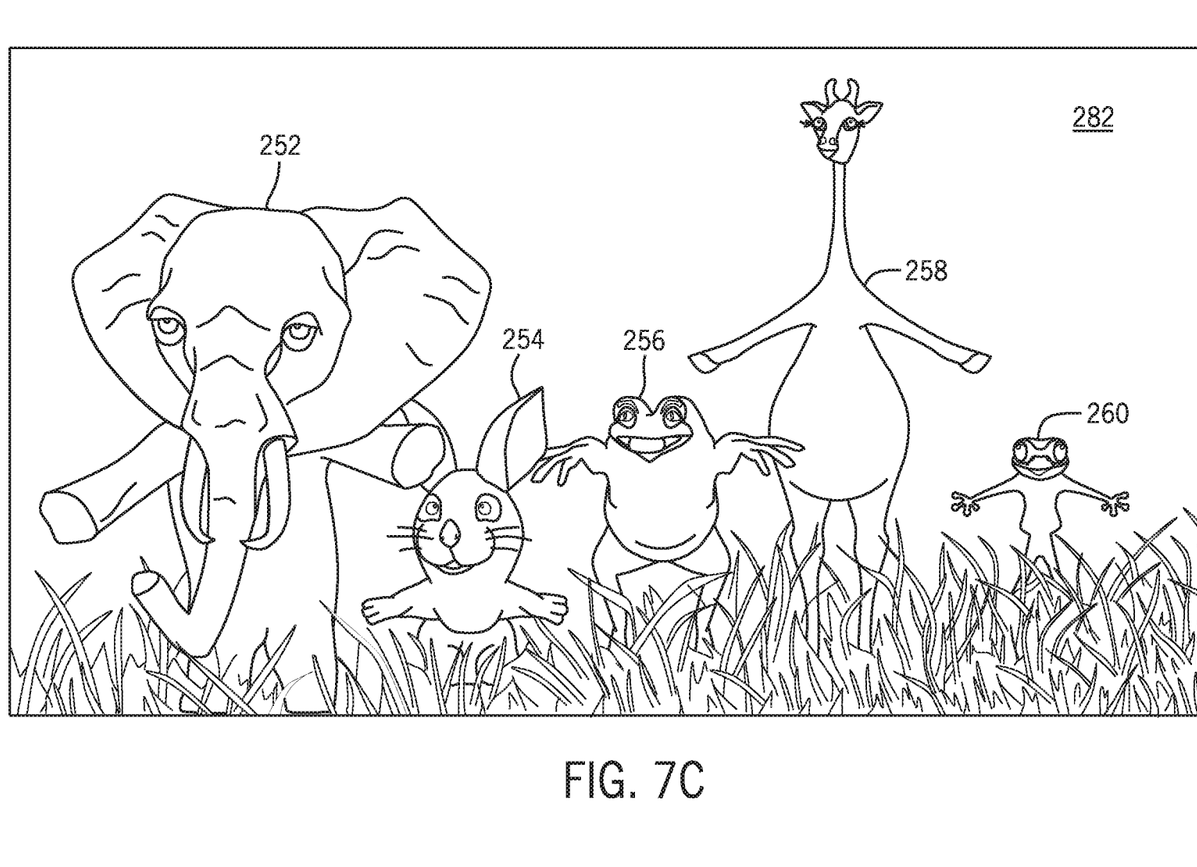
FIG. 7C is a third example of the composite image including gaze objects and audience objects with a third gaze viewpoint.

The method 200 allows different types of user engagement with a display 104. FIGS. 7A-7C illustrate various images generated using the method 200 that demonstrate the gaze character 260 continuing to be rendered based on the gaze direction of the designated viewer 118, such that the gaze character 260 appears to be undeformed regardless of the viewing angle or perspective of the designated viewer 118. In this example, as the viewer 118 continues to focus on different locations of the scene or walk to different locations relative to the display 104, such as to the right or left sides of the display 104. As the designated viewer 118 changes locations or gaze directions, the gaze character 260 will be adjusted such that the designated viewer 118 will view the character 260 consistently across all viewing angles. This is in contrast to the audience characters 252, 254, 256, 258 that are rendered from the same perspective in all frame, such that to vary the engagement with the audience based on different viewpoints, the audience objects will deform as shown in FIGS. 7A-7C as compared to FIG. 6, where the objects have their eyes and heads turned and deformed to meet an audience gaze direction.

It should be noted that the techniques described herein may be used with display effects, such as reflected, refracted, projected displays (e.g., Pepper's ghost techniques) that allow the projected object to maintain viewer engagement as the viewer changes positions, etc.

Conclusion

The methods and systems are described herein with reference to two dimensional displays. However, these techniques are equally applicable to other types of displays and display environments, such as three dimensional displays. With three dimensional displays, the objects may be rendered in a volumetric manner to give the appearance of depth and optionally two or more depth images (e.g., right eye and left eye) may be generated with the objects rendered from the determined axis. Additionally, while the rendering aspects have been discussed with respect to objects, in some instances, the techniques may be used to modify lighting and the like based on viewpoint to allow a more integrated engagement experience.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. An audience engagement method to display images on a display comprising:
   determining a gaze axis corresponding to a gaze direction of a designated viewer;
   rendering a gaze object within an image on the gaze axis, wherein the gaze axis extends outwards from the display;
   rendering an audience object within the image on a normal axis corresponding to a display axis;
   compositing the audience object and the gaze object together to generate a composited image; and
   displaying the composited image on the display.

2. The method of claim 1, wherein the gaze display axis varies based on variations of the gaze direction of the designated viewer.

3. The method of claim 1, further comprising extracting the audience object from a rendered image, wherein the extracted audience object is composited into the composited image.

4. The method of claim 1, further comprising detecting an audience direction corresponding to an audience viewing direction of one or more audience viewers.

5. The method of claim 4, wherein the audience object is rendered to take into account the audience viewing direction.

6. The method of claim 5, wherein the audience object is deformed on the normal axis to take into account the audience viewing direction.

7. The method of claim 1, wherein the gaze axis is not parallel to the normal axis.

8. The method of claim 1, further comprising rendering a scenic object relative to a scenic axis, wherein the scenic object is positioned between the gaze object and the audience object and the scenic axis is between the normal axis and the gaze axis.

9. An interactive display method to display images to a plurality of viewers, the method comprising:
determining a first gaze image of a gaze viewer of the plurality of viewers;
utilizing the first gaze image to detect a gaze direction of the gaze viewer;
rendering a first image object based on the gaze direction of the gaze viewer, wherein the first image object is rendered relative to a first axis, wherein first axis extends outwards from the display;
rendering a second image object relative to a second axis; and
combining the first image object and the second image object into an image frame; and
displaying the image frame on a display.

10. The interactive display method of claim 9, wherein the first axis and the second axis are not parallel to one another.

11. The interactive display method of claim 9, wherein the second axis is fixed and the first axis is variable based on the gaze direction of the gaze viewer.

12. The interactive display method of claim 9, further comprising:
masking the second image object, wherein combining the first image object and the second image object includes overlaying the second image object into an image including the gaze object to generate the image frame.

13. The interactive display method of claim 9, wherein detecting the gaze direction comprises analyzing the first gaze image for at least one of a head position, an eye position, or a body gesture.

14. The interactive display method of claim 9, further comprising:
capturing a second gaze image of the gaze viewer;
utilizing the second gaze image to detect an updated direction of the gaze viewer;
rendering the first image object based on the updated gaze direction of the gaze viewer, wherein the first image object is rendered relative to an updated position of the first axis, wherein the updated axis position corresponds to the updated gaze direction of the gaze viewer;
combining the updated first image object with the second image object into an updated image frame; and
displaying the updated image frame.

15. An image display system for audience engagement comprising:
a display that generates visual images;
a camera that captures images of audience members; and
a computer in electronic communication with the display and the camera, wherein the camera is configured to:
receive a designated member image:
analyze the designated member image to determine a view direction of the designated member;
receive a first image frame comprising a first group of objects corresponding to an audience view and a second group of objects corresponding to a designated view;
render the first group of objects on a first axis;
render the second group of objects based on a second axis corresponding to the view direction of the designated member, wherein the second axis extends outwards from the display;
composite the first group of objects and the second group of objects into a composite image; and
transmit the composite image to the display.

16. The image display system of claim 15, wherein the display is a two-dimensional display.

17. The image display system of claim 15, wherein the first axis and the second axis are defined at an angle relative to one another.

18. An image display method, comprising:
rendering by a processing element a first group of objects with a normal perspective;
rendering by the processing element a second group of objects with an anamorphic perspective;
compositing by the processing element the first group of objects and the second group of objects into a composite image; and
transmitting by the processing element the composite image to a display.

19. The image display method of claim 18, further comprising rendering by the processing element a transition object from a transition perspective, wherein the transition perspective is between the normal perspective and the anamorphic perspective.

20. The method of claim 1, wherein the gaze object is rendered such that the gaze object looks towards the designated viewer.

* * * * *